United States Patent
Humphrey et al.

(10) Patent No.: US 6,575,477 B2
(45) Date of Patent: Jun. 10, 2003

(54) QUICK CHANGE TRUE LENGTH COLLET CHUCK ASSEMBLY

(75) Inventors: James A. Humphrey, Anaheim, CA (US); Donald W. Ferris, Silver City, NM (US)

(73) Assignee: Advanced Tool Systems, Inc., Anaheim, CA (US)

( * ) Notice: Subject to any disclaimer, the term of this patent is extended or adjusted under 35 U.S.C. 154(b) by 0 days.

(21) Appl. No.: 09/827,401

(22) Filed: Apr. 6, 2001

(65) Prior Publication Data

US 2002/0145261 A1 Oct. 10, 2002

(51) Int. Cl.$^7$ .............................................. B23B 31/12
(52) U.S. Cl. ........................................ 279/46.7; 279/50
(58) Field of Search ............................ 279/50, 57, 46.7

(56) References Cited

U.S. PATENT DOCUMENTS

| | | | |
|---|---|---|---|
| 4,858,938 A | 8/1989 | Terwilliger et al. | 279/57 |
| 5,087,059 A | 2/1992 | Terwilliger | 279/1 ME |
| 5,096,213 A | 3/1992 | Terwilliger et al. | 279/51 |
| 5,160,150 A | 11/1992 | Schmidt | 279/58 |
| 5,480,164 A | 1/1996 | Murphy | 279/50 |
| 5,549,308 A | 8/1996 | Bennett | 279/50 |
| 5,855,377 A | 1/1999 | Murphy | 279/50 |
| 6,290,241 B1 * | 9/2001 | Fink | |

OTHER PUBLICATIONS

Hardinge, Inc., Brochure 2339, "HQC Quick–Change Collet System," Apr. 1999 (12 pages).

Hardinge, Inc., "installing Collet Head: Manual/Hydraulic Changing Wrench," 1 sheet.

* cited by examiner

Primary Examiner—Stephen Blau
(74) Attorney, Agent, or Firm—Koppel, Jacobs, Patrick & Heybl

(57) ABSTRACT

A true length collet chuck assembly is adapted to receive and actuate a quick change, segmented collet having a flange extending radially outwardly from the outer surface of the collet adjacent a rear face of the collet. The collet chuck assembly comprises a chuck body having a longitudinally extending bore defined by an inwardly facing, cylindrical surface on the chuck body. The inwardly facing, cylindrical surface on the chuck body defines a circumferential groove for receiving the radially outwardly extending flange on the collet to thereby restrain the collet against axial movement relative to the chuck body. A collet closing sleeve, disposed within the chuck body and axially displaceable relative thereto, has an outwardly flaring interior surface adapted to engage an outwardly flaring surface on the collet. Axial displacement of the closing sleeve relative to the chuck body in one direction compresses the quick change collet to grip a workpiece and axial displacement of the closing sleeve in the other direction allows the quick change collet to expand and release the workpiece. A collet actuator is disposed within the chuck body and is adapted to be coupled to an actuator driver for axially displacing the collet actuator relative to the chuck body. The collet actuator is releasably coupled to the rear portion of the closing sleeve. Axial displacement of the collet actuator by means of the actuator driver correspondingly displaces the closing sleeve whereby the collet is compressed or allowed to expand.

6 Claims, 7 Drawing Sheets

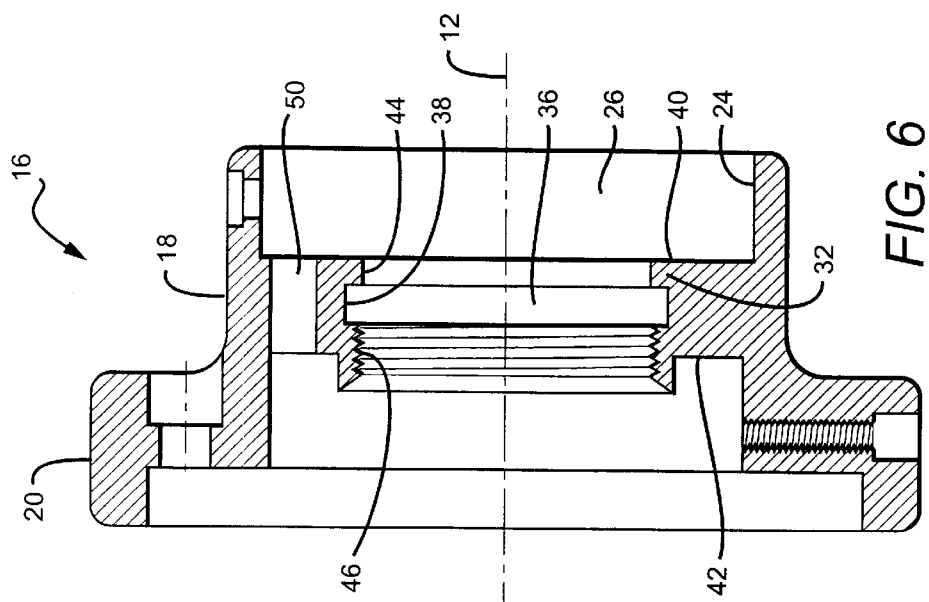
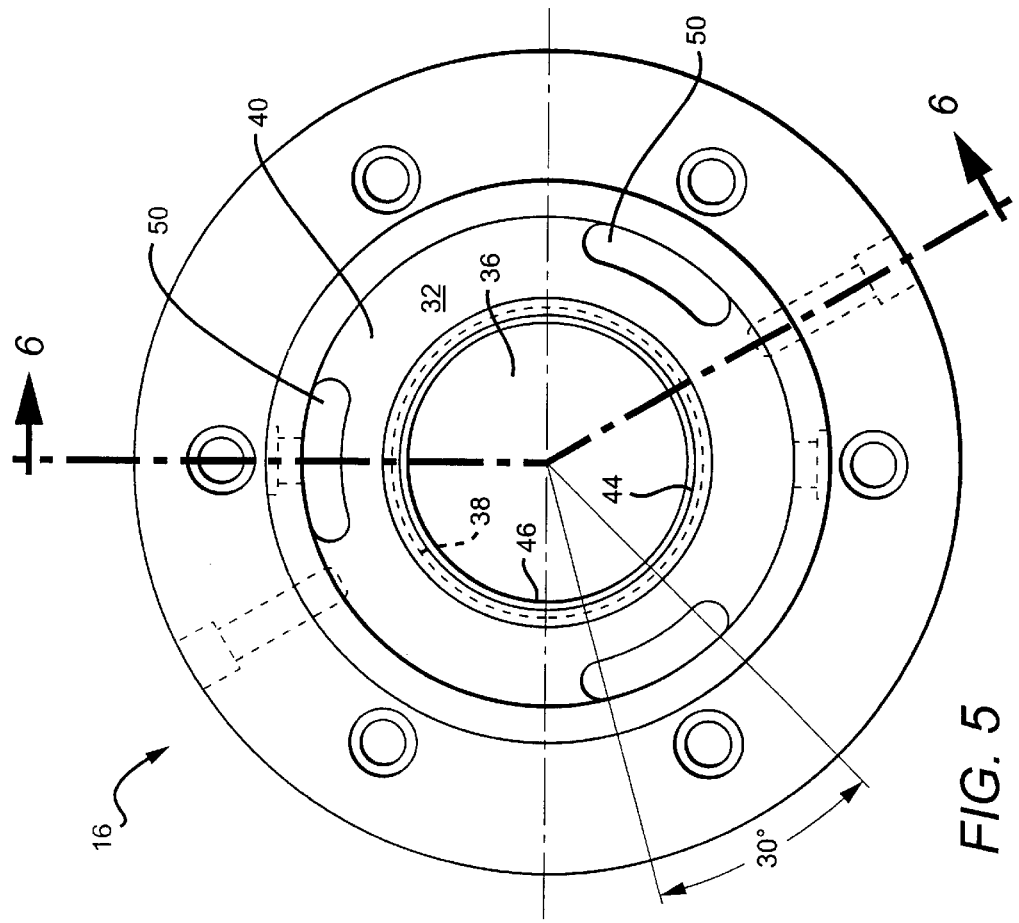
FIG. 6
FIG. 5

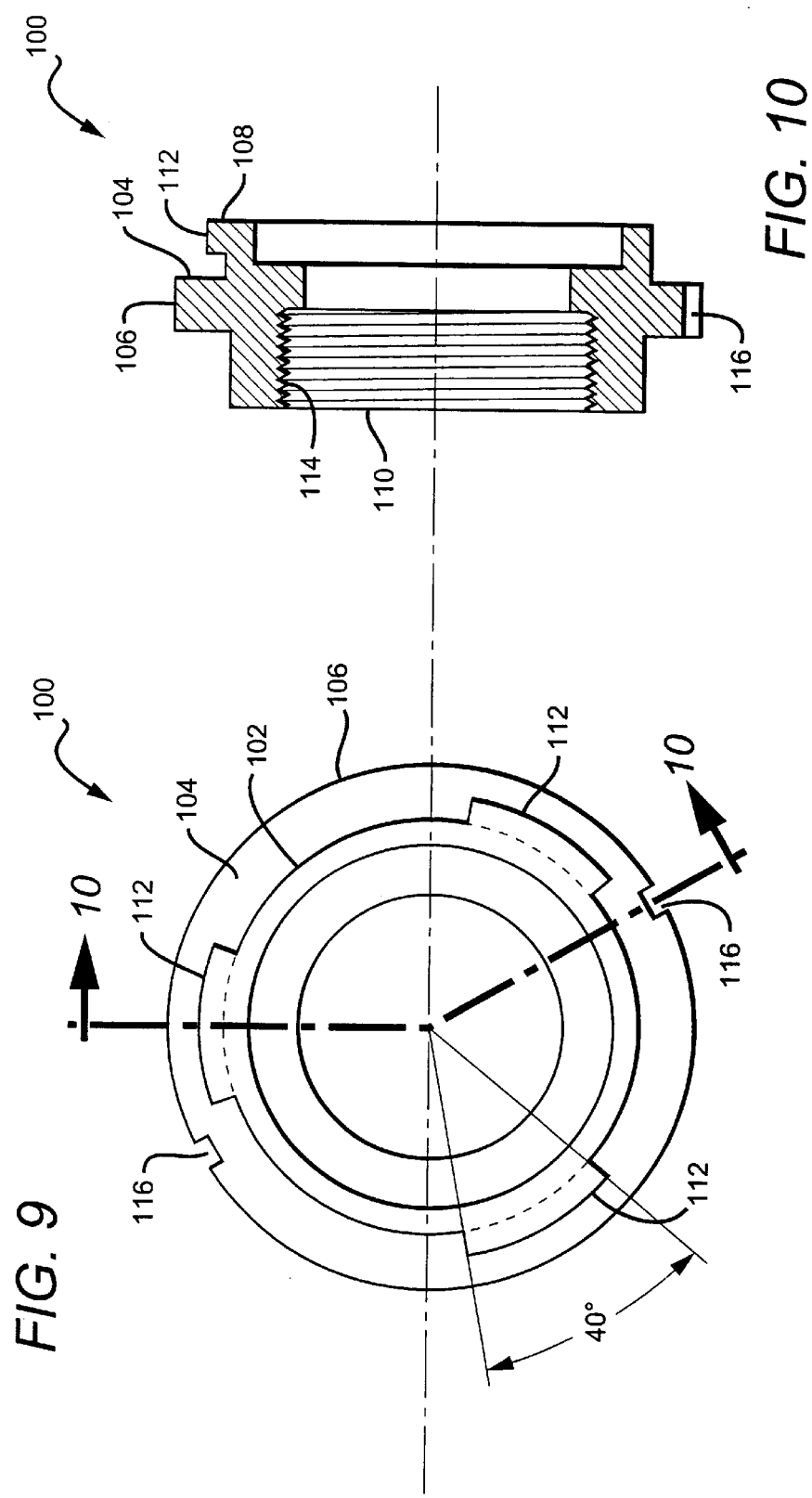

QUICK CHANGE TRUE LENGTH COLLET CHUCK ASSEMBLY

BACKGROUND OF THE INVENTION

1. Field of the Invention

The present invention relates generally to collet chuck assemblies and particularly to a precision, true length, collet chuck assembly for holding a workpiece against axial displacement during the collet closing and opening sequences, and which utilizes collets that can be quickly changed from one collet size to another.

2. The Prior Art

"Quick change" collets for mounting on the spindles of machine tools such as automatic screw machines, lathes, and the like, are well known. Examples of such collets, manufactured by Hardinge, Inc., Elmira, N.Y., are disclosed in U.S. Pat. Nos. 4,858,938 and 5,096,213, both of which are incorporated by reference herein in their entireties. A typical quick change collet has two parts including a collet head and a collet body for receiving the collet head. The collet head comprises a segmented structure having an internal, typically cylindrical work gripping surface and an external, outwardly flaring surface adapted to cooperate with a correspondingly flared inner surface formed on a mounting fixture bolted to the spindle of the machine tool. The rear portion of the collet head includes a radially outwardly projecting flange that locks with a radially inwardly extending ridge on the collet body. Removal of the collet head is accomplished by pressing together the segments of the collet head at the rear portion by means of a special tool so that the flange on the collet head clears the ridge on the collet body. The collet head is then easily withdrawn from the collet body. Installation of the collet head is accomplished by the same tool which compresses the collet head segments so that the flange on the collet clears the ridge in the collet body as the rear end of the collet head is slid into the tubular collet body. When the flange clears the ridge, pressure is released from the collet head allowing the collet head to expand and the flange to lock with the ridge. A tool for installing the collet head in the collet body and removing it therefrom is disclosed in U.S. Pat. No. 5,087,059, incorporated herein by reference in its entirety.

The segments of the segmented collet head are spaced apart circumferentially and connected together by means of rubber inserts spanning the spaces between adjacent segments. The rubber inserts function to hold the segments of the collet head together while at the same time providing a spring means to force the collet head segments to move apart when closing pressure is removed from the collet head to release the workpiece. When the collet head is in the closed or work gripping position, the rubber inserts are substantially compressed.

The rear portion of the collet body is adapted to threadedly receive a draw or pull tube forming part of the machine tool. With the collet head in place in the collet body, retraction of the pull tube retracts the collet body and the collet head attached thereto relative to the mounting fixture so as to compress the collet head and grip the workpiece. Conversely, advancement of the pull tube pushes the collet body and attached collet head forwardly relative to the mounting fixture permitting the collet head to open and release the workpiece. Because the work-holding collet head moves relative to the fixed mounting fixture of the machine tool, this longitudinal or axial displacement can cause errors in the machining operation.

True or dead length collet chuck assemblies for holding a standard, that is, non-quick change, collet against longitudinal or axial displacement so as to eliminate errors in the machining operation are also well known. For example, U.S. Pat. Nos. 5,480,164 and 5,855,377, both of which are incorporated herein by reference in their entireties, each discloses a true length collet chuck assembly in which a standard collet having a split forward end portion is threadedly received by a collet retaining ring secured to an interior surface of a chuck body. A longitudinally displaceable camming or closing sleeve surrounding the collet and having an outwardly flaring, internal camming surface operatively associated with an outwardly flaring, exterior surface on the split forward end portion of the collet, compresses or releases the jaws of the collet. The longitudinally displaceable closing sleeve is actuated by means of a collet actuator coupled to the closing sleeve and to a mechanically or hydraulically operated push tube mounted on the machine tool. Advancement or forward axial movement of the closing sleeve relative to the axially fixed collet compresses the jaws of the collet to grip the workpiece while retraction of the closing sleeve releases the collet jaws from the workpiece.

Although the true length collet chucks of the aforementioned patents substantial advanced the state of the art, there continues to exist a need for still further improvements. For example, it would be desirable to provide a collet chuck assembly that can provide the advantages of both true length and quick change collet operation.

SUMMARY OF THE INVENTION

In accordance with one, specific exemplary embodiment of the present invention, there is provided a true length collet chuck assembly having a longitudinal, central axis. The collet chuck assembly is adapted to receive and actuate a quick change collet having a longitudinal, central axis that coincides with the axis of the assembly when the collet is in place within the assembly. The quick change collet defines a radially extending rear face, an inner workholding surface concentric with the axis of the collet and an outer surface concentric with the axis of the collet and including an outwardly flaring surface portion. The collet further includes a flange extending radially outward from the outer surface of the collet adjacent the rear face of the collet.

The collet chuck assembly comprises a chuck body having a longitudinally extending bore centered on the axis of the assembly and defined by an inner cylindrical surface on the chuck body. The inner cylindrical surface on the chuck body defines a circumferential groove for receiving the radially outwardly extending flange on the quick change collet to thereby restrain the collet against axial movement relative to the chuck body. The assembly further includes a collet closing sleeve disposed within the chuck body and axially displaceable relative thereto. The closing sleeve has front portion, a rear portion and an interior surface, the interior surface of the closing sleeve at the front portion thereof being outwardly flared to engage the outwardly flared surface on the quick change collet. Axial displacement of the closing sleeve relative to the chuck body in one direction compresses the collet to grip a work piece and axial displacement of the closing sleeve in the other direction allows the quick change collet to expand to release the work piece. The collet chuck assembly also includes a collet actuator disposed within the chuck body, the collet actuator being adapted to be coupled to a collet actuator driver, such as a push tube, for axially displacing the collet actuator relative to the chuck body. The collet actuator is coupled to the rear portion of the closing sleeve, whereby axial displacement of the collet actuator correspondingly displaces the closing sleeve whereby the collet is compressed or allowed to expand.

In accordance with another aspect of the specific, exemplary embodiment of the invention, the collet closing sleeve includes a plurality of rearwardly extending fingers, the collet actuator and the fingers on the collet closing sleeve being configured to interengage so that they are movable together axially. The chuck body preferably includes a radially inwardly extending wall defining the inner cylindrical surface on the chuck body, the front portion of the closing sleeve being disposed forwardly of the wall and the collet actuator being disposed rearwardly of the wall. The wall defines a plurality of longitudinally extending, circumferentially spaced apart openings, each of the plurality of rearwardly extending fingers on the collet closing sleeve extending longitudinally through one of the openings. Further, each of the plurality of rearwardly extending fingers on the collet closing sleeve has an internal surface defining a circumferentially extending groove. The collet actuator includes a plurality of circumferentially spaced apart, radially outwardly projecting flange segments, each flange segment being received by the groove of a corresponding finger in interlocking fashion. The circumferential spaces between the flange segments on the collet actuator each subtends a first angle while each of the plurality of rearwardly extending fingers on the collet closing sleeve subtends a second angle. The first angle is greater than the second angle so as to permit separation of the collet closing sleeve and the collet actuator. Preferably, both the collet closing sleeve and the collet actuator are releasably restrained against rotation relative to the chuck body.

The quick change collet may be installed in the chuck body and removed therefrom in a manner well known in the art using a special tool, facilitating the rapid interchangeability of collets having various sizes. At the same time, the restraint of the installed quick change collet relative to the chuck body in the longitudinal or axial direction provides a true length feature for precise workpiece length control.

BRIEF DESCRIPTION OF THE DRAWINGS

Further objects, features and advantages of the invention will become evident from the detailed description below when read in conjunction with the accompanying drawings in which:

FIG. 5 is a front elevation view of a chuck body forming part of the chuck assembly of the present invention;

FIG. 6 is a side elevation view, in cross section, of the chuck body shown in FIG. 5, as seen along the line 6—6 in FIG. 5;

FIG. 9 is a front elevation view of a collet actuator forming part of the chuck assembly of the present invention; and FIG. 10 is a side elevation view, in cross section, of the collet actuator shown in FIG. 9, as seen along the line 10—10 in FIG. 9.

DETAILED DESCRIPTION OF THE PREFERRED EMBODIMENT

Figure 1:
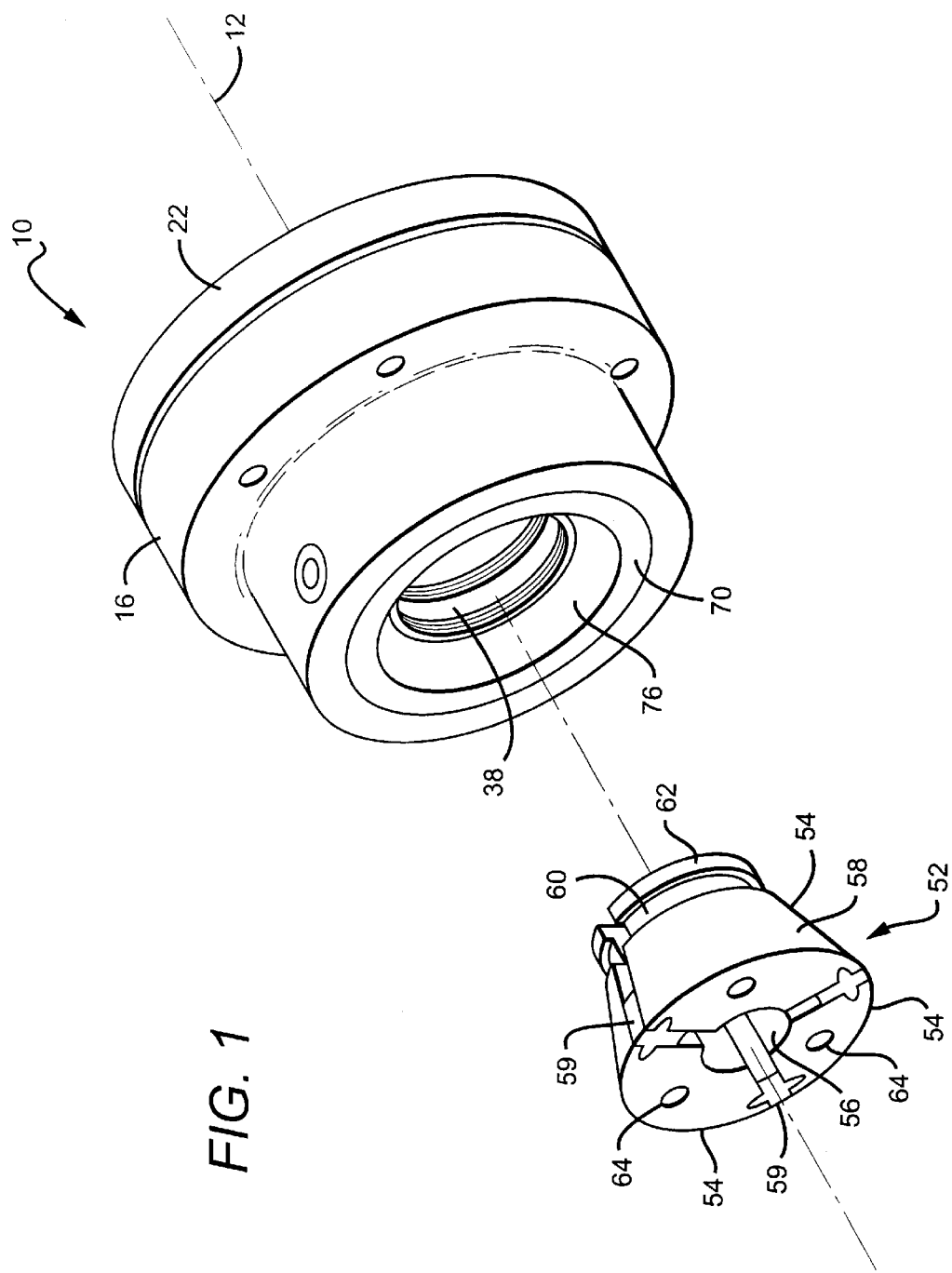
FIG. 1 is a perspective view of a quick change, true length collet chuck assembly in accordance with the present invention, along with a quick change collet adapted to be received by the chuck assembly.
Figure 2:
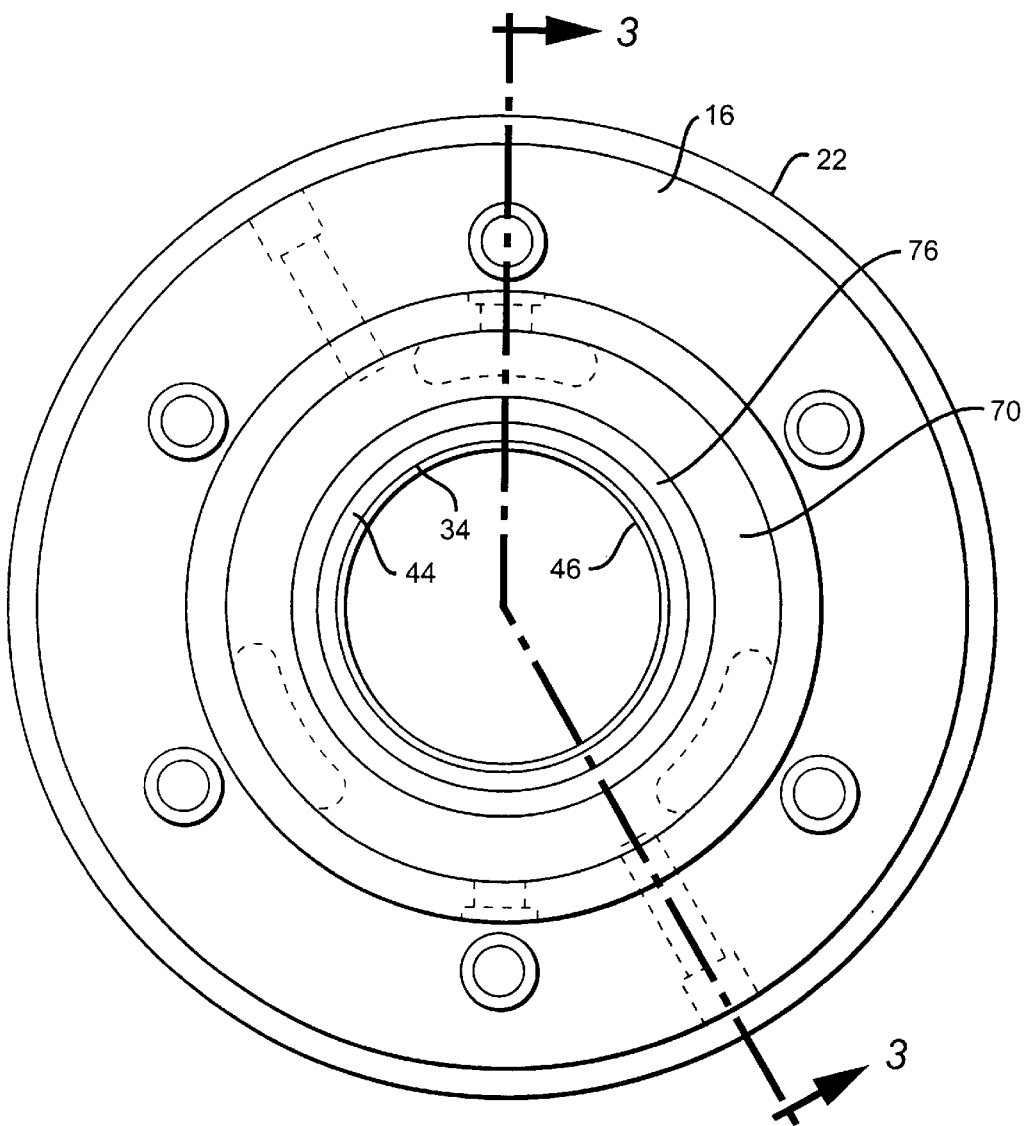
FIG. 2 is a front elevation view of the chuck assembly shown in FIG. 1.

The following describes a preferred embodiment of the invention representing the best mode contemplated for practicing the invention. This description is not to be taken in a limiting sense but is made merely for the purpose of describing the general principles of the invention whose scope is defined by the appended claims.

Referring to the drawings, there is shown a collet chuck assembly 10 having a longitudinal, central rotational axis 12. The collet chuck assembly 10 is adapted to be attached to the rotatable spindle (not shown) on the headstock of a lathe or other machine tool. The rotatable spindle of the machine tool includes a push tube 14 that is axially displaceable relative to the machine tool spindle in a manner well known in the art.

The collet chuck assembly 10 includes a chuck body 16 having a front portion 18 and a rear portion 20. The rear portion 20 of the chuck body 16 is bolted to a mounting plate 22 which in turn is adapted to be secured, by bolts or otherwise, to the machine tool spindle. The chuck body 16 has an inner, cylindrical surface 24 defining a bore 26 coaxial of the longitudinal rotational axis. In the specific embodiment illustrated, disposed within the 26 bore is an annular wall 32 projecting radially inwardly from the inner surface 24 of the chuck body and having an inner cylindrical surface 34 defining a bore 36 centrally disposed about the longitudinal axis 12. Formed in the inner cylindrical surface 34 is a circumferential groove 38 which, in accordance with the preferred embodiment, has a generally rectangular cross section. The annular wall has front and rear radially extending surfaces 40 and 42, respectively. The portion of the inner cylindrical surface 34 forwardly of the groove 38 defines a ridge 44. The portion of the inner cylindrical surface 34 rearwardly of the groove 38 is provided with internal threads 46 for purposes not relevant to the present invention. It will be appreciated that the annular wall 32, which forms part of the chuck body 16, is fixed in an axial direction during operation of the machine tool.

The wall 32 defines a plurality of arcuate slots 50 extending longitudinally between the front and rear surfaces 40 and 42 of the wall. Viewed along the longitudinal central axis, the arcuate slots 50, of which there are three in this embodiment, are equiangularly spaced about the central axis 12 with each slot, in accordance with one specific embodiment illustrated here, subtending an angle of about 30° (FIG. 5).

The collet chuck assembly 10 is adapted to retain in the front portion thereof a quick change collet 52 of the kind manufactured by Hardinge, Inc., Elmira, N.Y., as disclosed, for example, in U.S. Pat. Nos. 4,858,938 and 5,096,213, as mentioned above. The quick change collet 52 comprises a plurality of circumferentially spaced apart segments 54 collectively defining an internal, typically cylindrical work gripping surface 56 and an external surface including an outwardly flaring surface portion 58. The segments 54 of the segmented collet 52 are spaced apart circumferentially and connected together by means of rubber inserts 59 spanning the spaces between adjacent segments. The rubber inserts 59 function to hold the collet segments 54 together while at the same time providing a spring means to force the collet segments to move apart when closing pressure is removed from the collet to release the workpiece. When the collet 52 is in the closed or work gripping position, the rubber inserts 59 are substantially compressed.

The collet segments 54 have rear portions collectively defining an annular groove 60 and a flange 62 extending radially outwardly from the outer surface of the collet adjacent the groove 60. The radially outwardly extending segmented flange 62 on the collet 52 is adapted to be received by the groove 38 defined by the inner cylindrical surface on the wall 32 on the chuck body. As is well known, removal of a quick change collet of the type shown is accomplished by compressing the collet at the rear portion by means of a special tool (not shown) by enough distance so that the segmented flange 62 on the collet clears the ridge 44 forwardly of the groove 38, facilitating the easy removal of the collet from the chuck body. Such tool includes a plurality of dowels or pins, each being adapted to be inserted in a longitudinal extraction hole 64 formed in the front face of each collet segment 54. Installation of the collet is accomplished by the same tool which compresses the segments of the collet so that the segmented flange 62 on the rear of the collet clears the ridge 44 defined by the wall on the chuck body as the rear end of the collet is slid into the chuck body. When the flange 62 on the rear of the collet clears the ridge 44, pressure is released from the collet, allowing the collet to expand and allowing the flange 62 to expand into its locking engagement with the groove 38 on the inner surface of the chuck body wall 32. Similarly, the ridge 44 enters the groove 60 on the rear of the collet 52. As already noted, a tool for installing and removing a quick change collet of the kind described here is disclosed in U.S. Pat. No. 5,087,059. As is known in the art, for a Hardinge quick change collet having three segments, the ridge 44 is provided with three offset mill cuts (not shown) to provide clearance for the segmented flange 62 when the collet 52 is collapsed for insertion into or removal from the chuck assembly 10. The required dimensions and location of the offset mill cuts conform to published specifications issued by Hardinge, Inc.

Figures 7, 8:
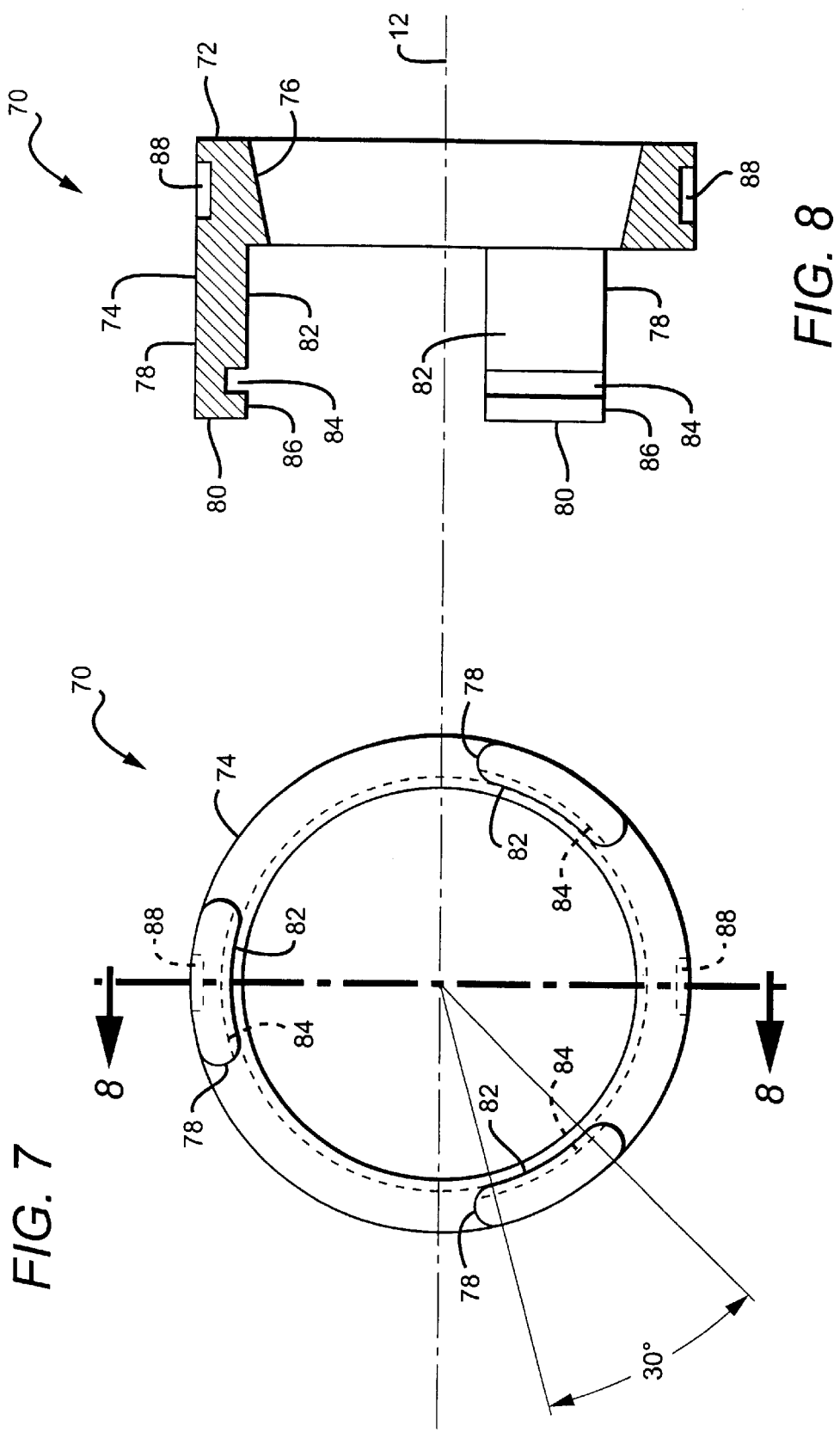
FIG. 7 is a rear elevation view of a collet camming or closing sleeve forming part of the chuck assembly of the present invention.
FIG. 8 is a side elevation view, in cross section, of the collet closing sleeve shown in FIG. 7, as seen along the line 8—8 in FIG. 7.

A collet camming or closing sleeve 70 coaxial of the central axis 12 is received within the chuck body bore 26 and is axially displaceable relative to the chuck body 16 to compress and release the segments 54 of the collet 52. The closing sleeve 70 includes a forward end portion 72 having an outer cylindrical surface 74 in slidable engagement with the inner surface 24 of the chuck body, and an internal, outwardly flared surface 76 matching the taper of the flared surface portion 58 of the outer surface of the collet 52. As is well known, the flared end portion 76 of the collet closing sleeve 70 engages the flared surface portion 58 of the collet to compress the collet segments 54 when the closing sleeve is axially displaced forwardly. Axial displacement of the closing sleeve 70 rearwardly allows the segments 54 of the quick change collet 52 to expand and release their grip on the workpiece. Projecting rearwardly from the front portion of the closing sleeve 70 are a plurality of equiangularly spaced, arcuate fingers 78, each having a rear extremity 80, an interior surface 82 and a circumferentially oriented groove 84 formed in the interior surface 82 adjacent the rear extremity 80. The portion of each finger 78 between the groove 84 and the rear extremity of the finger comprises a flange 86. In the example illustrated here, three fingers are provided each, as best seen in FIG. 7, subtending an angle of about 30°. Preferably, the closing sleeve 70 and rearwardly extending fingers 78 are formed as an integral, unitary structure, for example, by machining the closing sleeve and fingers from a single piece of stock. A pair of diametrically opposed, longitudinally extending slots 88 in the outer surface 74 of the front portion of the closing sleeve 70 each receives the inner end of a radially disposed screw 90 threadedly received in a hole in the front portion 18 of the chuck body 16. In this way, the closing sleeve 70 is freely movable in an axial direction but is restrained by the screws 90 against rotation relative to the chuck body.

The collet closing sleeve 70 is axially reciprocated by means of a collet actuator 100 having a cylindrical outer surface 102 and a radially outwardly extending flange 104 projecting from the outer surface 102. The flange 104 has an outer cylindrical surface 106 in axially slidable engagement with the inner cylindrical surface 24 on the chuck body. The collet actuator 100 has front and rear radially oriented faces 108 and 110, respectively. Projecting from the outer cylindrical surface 102 of the collet actuator adjacent the front face 108 thereof are a plurality of spaced apart flange segments 112. As best seen in FIG. 9, and by way of example only, the preferred embodiment includes three equiangularly spaced, identical flange segments 112, each of which, again by way of example and not limitation, subtends an angle of about 40°, adjacent flange segments being thereby angularly separated by about 80°. The rear portion of the collet actuator 100 has internal threads 114 to receive the externally threaded front extremity of the push tube 14. Formed in the outer cylindrical surface 106 of the flange 104 is a pair of diametrically opposed slots 116 for receiving radially oriented, rotation restricting screws 118 carried by the chuck body 16.

Figure 3:
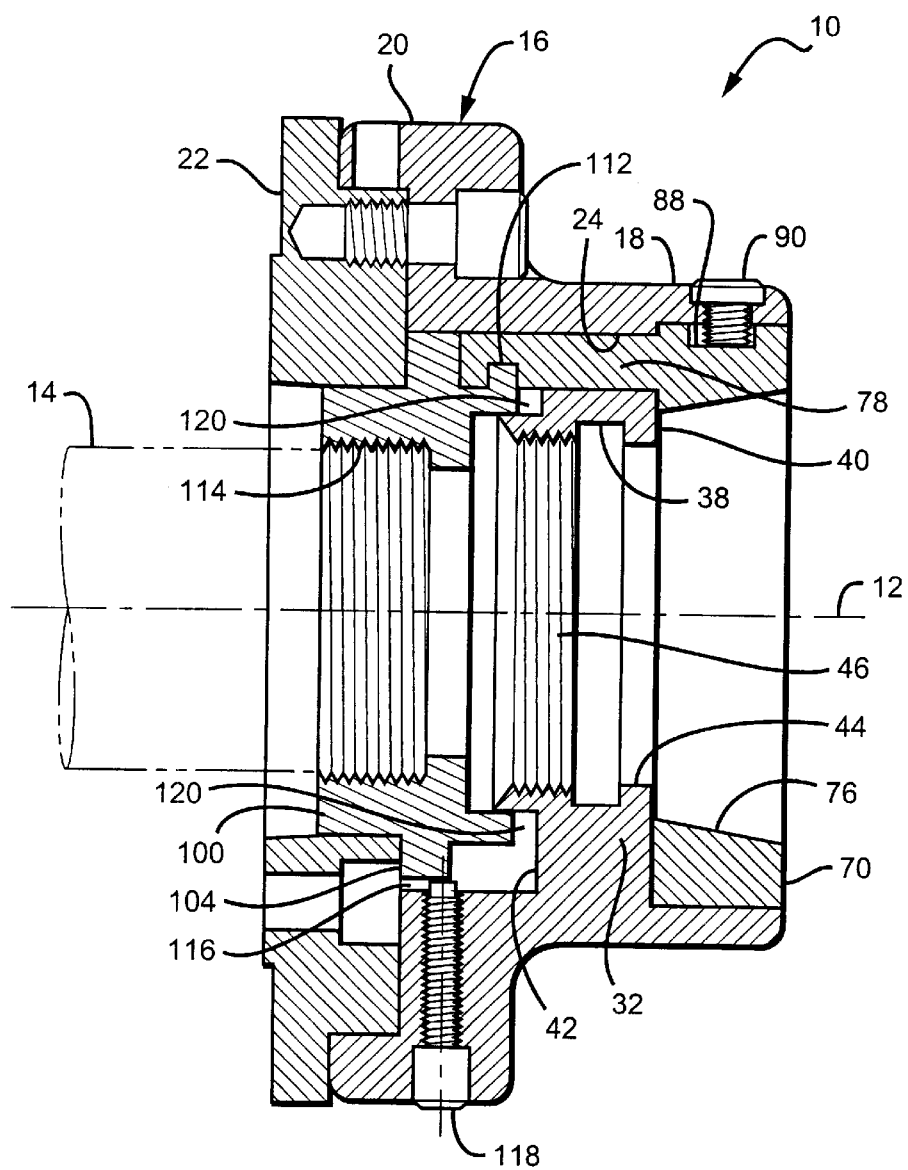
FIG. 3 is a side elevation view, in cross section, of the chuck assembly shown in FIGS. 1 and 2, as seen along the line 3—3 in FIG. 2.
Figure 4:
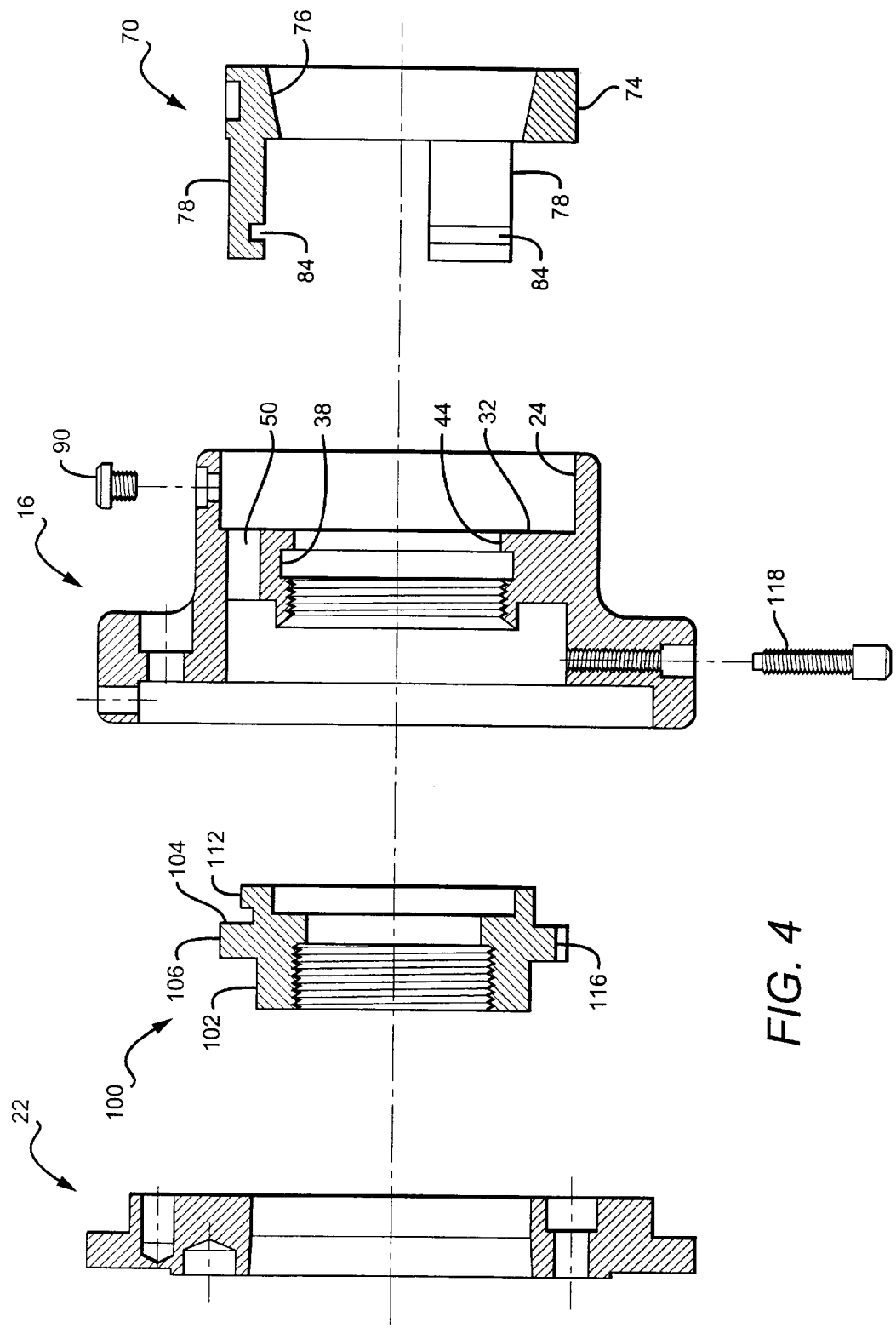
FIG. 4 is an exploded, side elevation view of the chuck assembly of the invention, showing the main components thereof.

As seen in FIG. 3, the rearwardly extending fingers 78 on the closing sleeve 70 extend through the corresponding arcuate slots 50 in the wall 32 on the chuck body, each flange segment 112 on the collet actuator 100 engaging the groove 84 in the inner surface 82 of one of the rearwardly extending fingers. With the collet actuator and closing sleeve 70 so interlocked, the collet closing sleeve is axially reciprocated by means of the collet actuator, in turn moved by the push tube 14. The collet actuator 100 and the closing sleeve 70 may be moved axially through a distance established by a gap 120 (FIG. 3) between the front face 108 of the collet actuator and the rear surface 42 of the wall 32 on the collet body 16. It will be appreciated that the internal threaded portion 114 of the collet actuator 100 may be dimensioned and threaded as necessary to receive the threaded push tube of a specific machine tool.

The present invention combines a quick release collet with a true length feature. The present invention also provides for a strong, fatigue failure-resistant connection between the collet actuator 100 and the collet sleeve 70. As seen in FIG. 3, the fingers 78 on the collet closing sleeve 70 are configured to interlock with the flange segments 112 on the collet actuator 100 in a manner resembling a tongue-and-groove joint. This interlocking yet releasable connection features large contacting surface areas which tend to distribute the cyclical loads imposed by the push tube 14. Stresses on the collet actuator/collet closing sleeve connection are thereby reduced, minimizing failure of the connection. The collet actuator 100 and closing sleeve 70 are coupled by inserting the rearwardly extending fingers 78 on the collet closing sleeve 70 through their corresponding arcuate slots 50 in the wall 32 of the chuck body and advancing the rear extremities of the fingers 78 into the spaces between adjacent flange segments 112 on the front of the collet actuator 100. The actuator 100 may then be rotated relative to the closing sleeve 70 so that the flange segments 112 on the collet actuator 100 enter the associated grooves 84 on the fingers 78. Rotation of the collet actuator 100 relative to the closing sleeve 70 is continued until the flange segments 112 are centered circumferentially relative to the closing sleeve fingers 78. The screws 90 and 118 on the chuck body are then advanced into their respective slots 88 and 116 on the closing sleeve and collet actuator.

While the present invention has been described with reference to a particular illustrative embodiment, the invention is not intended to be restricted to that embodiment but only by the appended claims. It will be appreciated that those skilled in the art can change or modify the described embodiment, or substitute equivalents for the various elements described and shown, without departing from the scope and spirit of the invention.

We claim:

1. A true length collet chuck assembly having a longitudinal, central axis, the assembly being adapted to receive and actuate a quick change collet having a longitudinal, central axis that coincides with the axis of the assembly when the collet is received by the assembly, the collet defining a radially extending rear face, an inner, workpiece holding surface concentric with the axis of the collet and an outer surface concentric with the axis of the collet and including an outwardly flaring surface portion, the collet further including a flange extending radially outwardly from the outer surface of the collet adjacent the rear face of the collet, the collet chuck assembly comprising:

a chuck body having a longitudinally extending bore defined by an inwardly facing, cylindrical surface on the chuck body, the inwardly facing, cylindrical surface on the chuck body being centered on the longitudinal axis of the assembly and defining a circumferential groove for receiving the radially outwardly extending flange on the collet to thereby restrain the collet against axial movement relative to the chuck body;

a collet closing sleeve disposed within the chuck body and axially displaceable relative thereto, the closing sleeve having front portion, a rear portion and an interior surface, the interior surface of the closing sleeve at the front portion thereof being outwardly flared to engage the outwardly flared surface on the collet, axial displacement of the closing sleeve relative to the chuck body in one direction compressing the collet to grip a work piece and axial displacement of the closing sleeve in the other direction allowing the collet to expand to release the work piece; and a collet actuator disposed within the chuck body, the collet actuator being adapted to be coupled to a collet actuator driver for axially displacing the collet actuator relative to the chuck body, the collet actuator being coupled to the rear portion of the closing sleeve, whereby axial displacement of the collet actuator by means of the collet actuator driver correspondingly displaces the closing sleeve whereby the collet is compressed or allowed to expand.

2. A true length collet chuck assembly, as defined in claim 1, in which:

the collet closing sleeve includes a plurality of rearwardly extending fingers, the collet actuator and the fingers on the collet closing sleeve being configured to interengage.

3. A true length collet chuck assembly, as defined in claim 2, in which:

the chuck body includes a radially inwardly extending wall defining the inner cylindrical surface on the chuck body, the front portion of the closing sleeve being disposed forwardly of the wall and the collet actuator being disposed rearwardly of the wall, the wall defining a plurality of longitudinally extending spaced apart openings, each of the plurality of rearwardly extending fingers on the collet closing sleeve extending through one of the openings.

4. A true length collet chuck assembly, as defined in claim 3, in which:

each of the plurality of rearwardly extending fingers on the collet closing sleeve having an internal surface, the internal surface of each finger having a circumferentially extending groove; and the collet actuator including a plurality of circumferentially spaced apart outwardly projecting flange segments, each flange segment being received by the groove of a corresponding finger in interlocking fashion.

5. A true length collet chuck assembly, as defined in claim 4, in which:

the circumferential spaces between the flange segments on the collet actuator each subtends a first angle; and each of the plurality of rearwardly extending fingers on the collet closing sleeve subtends a second angle, the first angle being greater than the second angle so as to permit separation of the collet closing sleeve and the collet actuator.

6. A true length collet chuck assembly, as defined in claim 1, in which:

both the collet closing sleeve and the collet actuator are releasably restrained against rotation relative to the chuck body.

* * * * *